(12) United States Patent
Wong et al.

(10) Patent No.: US 11,550,635 B1
(45) Date of Patent: Jan. 10, 2023

(54) USING DELAYED AUTOCORRELATION TO IMPROVE THE PREDICTIVE SCALING OF COMPUTING RESOURCES

(71) Applicant: Amazon Technologies, Inc., Seattle, WA (US)

(72) Inventors: Manwah Wong, Vancouver (CA); Kai Fan Tang, Port Coquitlam (CA); Christopher Thomas Lewis, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 958 days.

(21) Appl. No.: 16/368,775

(22) Filed: Mar. 28, 2019

(51) Int. Cl.
*G06F 9/50* (2006.01)
*G06F 9/455* (2018.01)
*G06F 17/15* (2006.01)
*G06N 5/02* (2006.01)
*G06F 16/901* (2019.01)
*G06N 3/08* (2006.01)

(52) U.S. Cl.
CPC ........... *G06F 9/5077* (2013.01); *G06F 9/455* (2013.01); *G06F 16/9017* (2019.01); *G06F 17/15* (2013.01); *G06N 3/08* (2013.01); *G06N 5/02* (2013.01); *G06F 9/45541* (2013.01); *G06F 9/45545* (2013.01); *G06F 2009/4557* (2013.01)

(58) Field of Classification Search
CPC .... G06F 9/5077; G06F 9/455; G06F 16/9017; G06F 17/15; G06F 9/45541; G06F 9/45545; G06F 2009/4557; G06N 3/08; G06N 5/02
See application file for complete search history.

(56) References Cited

U.S. PATENT DOCUMENTS

| | | | | |
|---|---|---|---|---|
| 10,484,301 B1* | 11/2019 | Shukla | ................... | H04L 47/823 |
| 2008/0086731 A1* | 4/2008 | Trossman | ................. | G06F 9/50 |
| | | | | 718/100 |
| 2011/0289333 A1* | 11/2011 | Hoyer | ..................... | H04L 47/72 |
| | | | | 713/323 |
| 2018/0024860 A1* | 1/2018 | Balle | ..................... | G06F 3/0653 |
| | | | | 718/104 |

(Continued)

OTHER PUBLICATIONS

Barr, Jeff, "New—Predictive Scaling for EC2, Powered by Machine Learning", AWS News Blog, Nov. 20, 2018, 12 pages.

(Continued)

*Primary Examiner* — Michael W Ayers
(74) *Attorney, Agent, or Firm* — Nicholson De Vos Webster & Elliott LLP

(57) ABSTRACT

Techniques are described for filtering and normalizing training data used to build a predictive auto scaling model used by a service provider network to proactively scale users' computing resources. Further described are techniques for identifying collections of computing resources that exhibit suitably predictable usage patterns such that a predictive auto scaling model can be used to forecast future usage patterns with reasonable accuracy and to scale the resources based on such generated forecasts. The filtering of training data and the identification of suitably predictable collections of computing resources are based in part on autocorrelation analyses, and in particular on "delayed" autocorrelation analyses, of time series data, among other techniques described herein.

17 Claims, 11 Drawing Sheets

(56) References Cited

U.S. PATENT DOCUMENTS

2018/0060205 A1\* 3/2018 Raj .................... G06F 11/3452
2019/0138338 A1\* 5/2019 Shimogawa .......... G06F 9/5083
2019/0163517 A1\* 5/2019 Fontoura ............... G06F 9/5005
2019/0317826 A1\* 10/2019 Jain ....................... G06F 9/5077
2020/0019841 A1\* 1/2020 Shaabana ............. G06N 3/0445

OTHER PUBLICATIONS

Tofallis, Chris, "A better measure of relative prediction accuracy for model selection and model estimation", Journal of the Operational Research Society, vol. 66, 2015, pp. 1352-1362 (Total 25 pages).

\* cited by examiner

US 11,550,635 B1

USING DELAYED AUTOCORRELATION TO IMPROVE THE PREDICTIVE SCALING OF COMPUTING RESOURCES

BACKGROUND

Service provider networks have enabled businesses and other organizations to more easily develop, deploy, and scale virtually any type of computing workload using various types of computing resources. The services provided by these service provider networks generally enable users to use, for example, compute resources (for example, by hosting virtual machine (VM) instances or containers, executing batch jobs, executing code without provisioning servers, and so forth), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), and the like.

Many service provider networks further enable users to automate capacity management for various services, including compute instance capacity and the capacity associated with other "elastic" computing resources. In the context of compute instances, for example, an auto scaling service can help users automatically provision and de-provision compute instances as the load associated with the user's applications varies over time. To manage such scaling, users can create defined and scalable collections of compute instances, sometimes referred to as "auto scaling groups." An auto scaling group can be configured, for example, such that it maintains at least a minimum number of healthy compute instances. Users can further specify scaling policies used by an auto scaling service to launch or terminate compute instances as demand for a user's application increases and decreases over time.

BRIEF DESCRIPTION OF DRAWINGS

Various embodiments in accordance with the present disclosure will be described with reference to the drawings, in which.

DETAILED DESCRIPTION

Figure 1:
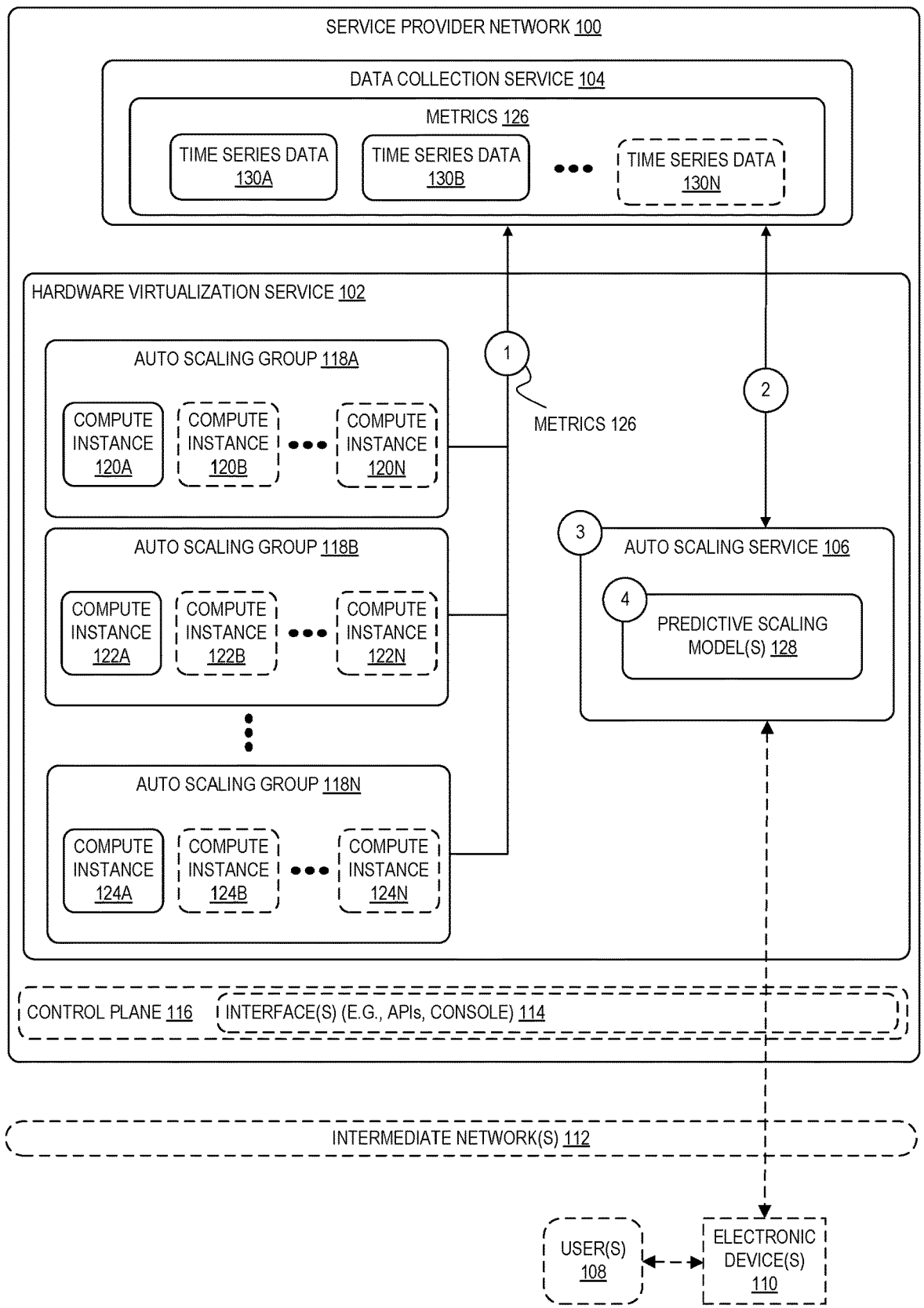
FIG. 1 is a diagram illustrating an environment for filtering and normalizing training data used to generate a predictive auto scaling model used by an auto scaling service according to some embodiments.

Various embodiments of methods, apparatus, systems, and non-transitory computer-readable storage media are described for filtering and normalizing training data used to build a predictive auto scaling model used by a service provider network to proactively scale users' virtual computing resources. Further described are techniques for identifying collections of virtual computing resources that exhibit suitably predictable usage patterns such that a predictive auto scaling model can be used to forecast future usage patterns with reasonable accuracy and to scale the resources based on such generated forecasts. In some embodiments, the filtering of training data and the identification of suitably predictable collections of virtual computing resources are based in part on autocorrelation analyses, and in particular on "delayed" autocorrelation analyses, of time series data, among other techniques described herein.

Auto scaling services provided by a service provider network generally enable users to automatically scale various types of virtual computing resources offered by a service provider network including, for example, compute instances, containers, storage resources, database tables and indexes, and the like. In the context of scaling compute instances, for example, scaling is typically initiated by an event, or scaling action, which instructs an auto scaling group to either launch or terminate a number of compute instances included in the group. An auto scaling service usually provides several ways for users to scale their virtual computing resources including, for example, manual scaling which enables users to explicitly specify changes to the desired capacity of an auto scaling group, scheduled scaling which enables scaling actions to be performed automatically as a function of time and date, and demand-based scaling where scaling policies are used to control the scaling process based on monitoring various metrics associated with an auto scaling group (for example, based on monitoring an average CPU utilization, incoming request count, or other metrics).

According to embodiments described herein, an auto scaling service of a service provider network further provides "predictive" auto scaling features in addition to the auto scaling options described above. In general, predictive auto scaling features enable the generation of forecasts of the future load associated with users' auto scaling groups or other defined collection of virtual computing resources and further enable the ability to proactively scale resources in advance of predicted load changes. The ability to proactively provision capacity in advance of predicted load changes can often enable scaling processes to occur faster and more efficiently compared to existing scaling services that typically scale more reactively to load changes. This further enables users of the service provider network to avoid having to manually adjust auto scaling parameters over time and generally makes auto scaling simpler to configure and use, among other benefits.

In some embodiments, the ability for predictive auto scaling services to forecast the load associated with users' auto scaling groups and to proactively scale resources accordingly is accomplished using machine learning (ML) algorithms. These algorithms, for example, can be used to produce a ML-based predictive auto scaling model that can detect daily patterns, weekly patterns, or other cyclical patterns associated with users' auto scaling groups and to create forecasts of load changes. As with virtually any ML-based application, the creation of an accurate and useful predictive model relies on using good training data. In this case, training data that is useful for building a predictive auto scaling model generally includes data that exhibits reasonably predictable daily, weekly, and/or other cyclical patterns so that similar cyclical patterns or trends can be identified in practice. Embodiments described herein provide ways to filter and normalize potential training data such that the resulting training data used to build a predictive auto scaling model is associated with such reasonably predictable usage patterns.

Similarly, the use of predictive models generally can work well for computing resources that exhibit reasonably predictable usage patterns (for example, patterns that exhibit one or more cyclical patterns day-to-day, week-to-week, and so forth). In contrast, if the load associated with an auto scaling group over time follows a largely random pattern (that is, the data reflecting the virtual computing resources' usage pattern includes a significant amount of noise), an ML-based model cannot reasonably be expected to predict future patterns with high accuracy no matter how well-trained. Thus, the use of predictive auto scaling features is generally better suited for some collections of computing resources compared to others depending on the inherent predictability of each collection of computing resources.

According to embodiments described herein, an auto scaling service further helps users identify whether a particular auto scaling group or other collection of virtual computing resources is a good candidate for using predictive auto scaling, where this determination is based on a delayed autocorrelation analysis and the generation of autocorrelation scores. For example, if a user has several auto scaling groups, each associated with different types of applications and corresponding usage patterns, the service can help identify which of the user's auto scaling groups will likely benefit from using a trained predictive model to proactively scale the associated resources. This can enable users to choose predictive auto scaling for those resources that have suitable periodicity, and can help users avoid using predictive auto scaling for resources that might be inaccurately scaled. The use of delayed autocorrelation analyses and other techniques in relation to these processes is described in more detail hereinafter.

As described herein, a predictive model for forecasting future resource usage for cyclically varying workloads may be trained on data filtered using the disclosed autocorrelation techniques. In some implementations the disclosed autocorrelation techniques can also be used to identify new workloads for which the predictive model can be used for proactive, predictive scaling. However, suitability of the predictive model for use with new workloads can be determined in alternate implementations by generating resource usage forecasts using the trained model, observing actual resource usage (or a repeat of a certain window of past actual usage), and then using the error rate between the forecast and the actual usage to determine whether or not the forecast was accurate. These two techniques may be used in combination to assess suitability in some implementations. Further, the disclosed predictive model can be used for generating time series forecasts outside of the context of predictive scaling. For example, the disclosed predictive model can be used to forecast usage of resources from among a pool of resources reserved for a primary workload, in order to schedule usage of any unused resources without interfering with the primary workload.

FIG. 1 is a diagram illustrating an environment for filtering and normalizing training data used to generate a predictive auto scaling model according to some embodiments. In some embodiments, a hardware virtualization service 102, a data collection service 104, and an auto scaling service 106, among any number of other possible services, operate as part of a service provider network 100. Each service comprises one or more software modules executed by one or more electronic devices at one or more data centers and geographic locations. User(s) 108 using one or more electronic device(s) 110 (which may be part of or separate from the service provider network 100) can interact with the various services of the service provider network 100 via one or more networks, such as the internet. Although the example shown in FIG. 1 describes the scaling of computing resources provided by a hardware virtualization service (for example, VM instances or containers), the processes described herein can be used to improve auto scaling processes related to virtually any type of virtual computing resource including, but not limited to, VM instances, containers, database tables or indexes, storage resources, and so forth.

A service provider network 100 provides users with the ability to utilize one or more of a variety of types of computing-related resources such as compute resources (for example, executing VM instances and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service 102 that can execute compute instances, a storage service that can store data objects, and so forth. The users (or "customers") of service provider networks 100 may utilize one or more user accounts that are associated with a customer account, though these terms may be used somewhat interchangeably depending upon the context of use. Users may interact with a service provider network 100 across one or more intermediate networks 112 (for example, the internet) via one or more interface(s) 114, such as through use of application programming interface (API) calls, via a console implemented as a website or application, etc. The interface(s) 114 may be part of, or serve as a front-end to, a control plane 116 of the service provider network 100 that includes "backend" services supporting and enabling the services that may be more directly offered to customers.

To provide these and other computing resource services, service provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting a computing job or code to be executed by the provider network, which in turn utilizes one or more compute instances to execute the job or code, typically without the user having any control of or knowledge of the underlying compute instance(s) involved.

As indicated above, users often desire to be able to scale the capacity of their virtual computing resources to maintain steady and predictable performance of their applications. For example, consider a user that desires to provision some number of compute instances to support the user's web-based application and further desires for the number of compute instances to increase and decrease as demand for the user's application changes over time. The user's application, for example, may be used more heavily during the day compared to nights and on weekdays compared to weekends, and the overall use of the application may increase over periods of months as it grows in popularity. For this purpose, the user uses the auto scaling service 106 to create an auto scaling group 118A associated with a scalable collection of compute instances 120A-120N. The same user, as well as any number of other users of the service provider network 100, have similarly created other auto scaling groups 118B-118N for other purposes (for example, where auto scaling group 118B includes compute instances 122A-122N and auto scaling group 118N includes compute instances 124A-124N, and so forth). The applications associated with each of these auto scaling groups may be associated with usage patterns that exhibit more or less cyclical and predictable usage patterns depending on the nature of each particular application. Although only a limited number of auto scaling groups 118A-118N are shown in FIG. 1, in general, an individual user can be associated with any number of separate auto scaling groups and there may be a very large number of auto scaling groups of varying sizes across all users of the service provider network 100, where the auto scaling groups may further include different compute instance types and be used to support any number of different types of workloads.

In an embodiment, an auto scaling service 106 helps users automate capacity management for various services of a service provider network, including a hardware virtualization service 102, by tracking capacity utilization of auto scaling groups over time. In the context of scaling compute instances provided by a hardware virtualization service 102, as in FIG. 1 for example, scaling is typically initiated by an event, or scaling action, which instructs an auto scaling group to either launch or terminate a number of compute instances included in the group. In the example, a user can configure an auto scaling group 118A to increase or decrease a number of associated compute instances based on a monitored average CPU utilization of the instances, a number of incoming requests, or based on any other associated metric.

As indicated above, in some embodiments, an auto scaling service 106 further includes "predictive" auto scaling features. At a high level, predictive auto scaling uses historical data reflecting usage of a virtual computing resource (for example, a quantity of compute instances in an auto scaling group) as input to a ML-based predictive model or other forecasting algorithm to generate forecasts of an expected load on those virtual computing resources at various points in time in the future. The auto scaling service 106 can then scale the resources accordingly in advance of the forecasted changes in load. The ability to scale compute capacity, or other types of scalable virtual computing resources, "just-in-time" for impending load change makes auto scaling faster and more efficient. According to embodiments described herein, an auto scaling service 106 includes processes for filtering and normalizing training data used to build one or more predictive auto scaling models 128 so that such models can be used to more accurately forecast such load patterns.

In some embodiments, at circle "1" in FIG. 1, some of all the compute instances of the auto scaling groups 118A-118N are configured to periodically emit or otherwise send various performance metrics 126 to a data collection service 104 of the service provider network 100. A data collection service 104 collects monitoring and operational data in the form of logs, metrics, and events, related to virtually any type of computing resource of a service provider network 100 including compute instances managed by a hardware virtualization service 102. As indicated above, metrics 126 collected by a data monitoring service 104 from compute instances or other virtual computing resources can be used as training data by an auto scaling service 106 to build one or more predictive scaling models 128 that can be used to forecast compute capacity needs for various auto scaling groups or other defined collections of virtual computing resources.

Although the data collection service 104 is shown as a separate standalone service of the service provider network 100 in FIG. 1, in other examples, the data collection service 104 may be a component of the hardware virtualization service 102 or a component of another service of the service provider network 100. In some embodiments, metrics may be collected and stored separately for each auto scaling group (for example, stored as time series data 130A corresponding to auto scaling group 118A, time series data 130B corresponding to auto scaling group 118B, and time series data 130N corresponding to auto scaling group 118N, and so forth), or separately for different users of the service provider network 100 or other logical groupings, for example, by using distinct "namespaces" to identify the metrics at the data collection service 104.

In some embodiments, at the circle labeled "2" in FIG. 1, the auto scaling service 106 obtains metrics 126 collected by the data collection service 104 to use as training data to create or further train a predictive auto scaling model. The auto scaling service 106 can obtain the metrics 126 from the data collection service 104 via an API or other interface between the services. As described above, metrics 126 can include historical time series data representing the load on various collections of virtual computing resources over time (for example, time series data indicating a quantity of compute instances used at successive past times in an auto scaling group as load changes over time, time series data indicating a request count for an application over time, time series data indicating average CPU load for a collection of compute instances, and so forth). The obtained metrics 126 can be associated with any number of separate auto scaling groups associated with any number of different users of the service provider network 100 and can span any range or ranges of time.

In some embodiments, the obtained metrics 126 are initially segmented into a set of separate time series where, for example, each time series in the set may span a time period of two weeks, a month, or any other defined period of time. As indicated above, the metrics 126 generally indicate a load on one or more defined collections of virtual computing resources at successive points in time in the past and thus each separate time series reflects a measured load for a particular span of time.

In some embodiments, at circle "3" in FIG. 1, the potential training data obtained at circle "2" is filtered and normalized. In general, a predictive auto scaling model 128 is trained using a filtered set of time series from the total set of obtained time series data to enable the predictive model to learn from time series that demonstrate both highly and moderately recognizable patterns and/or trends while excluding those that are excessively noisy or random in nature. The presence of noise in such time series generally arises from the fact that virtual computing resource usage patterns are typically subject to some degree of unpredictable human use patterns and other factors. The filtering attempts to strike a balance between allowing some amount of noise present in virtually any real-world data set while omitting time series that are overly noisy and would only degrade the quality of the resulting model. Normalization of the training data further helps to ensure that the time series used to train the model falls within a certain range so that parameter optimization converges to the optima, among other benefits.

In some embodiments, a process for filtering the training data involves using a delayed autocorrelation analysis to determine whether particular time series of a set of time series are suitably cyclical and to filter out time series that fail to meet a defined threshold autocorrelation value or "autocorrelation score." In some examples, an autocorrelation analysis involves a function that takes a time series as input and outputs "lag" and "autocorrelation" values. In one embodiment, these values are calculated as follows:

```
1    def autocorrelation (x):
2        n = len (x)
3        x = (x - np.mean(x))
4        result = np. correlate (norm, norm, mode="same")
5        acorr = result [ n//2 + 1:] / (x.var ( ) * np.arange (n-1, n//2 , -1))
6        lag = np.abs (acorr).argmax ( ) + 1
7        r = acorr [lag-1]
8        return r, lag
```

The algorithm above computes the correlation values between a time series x and a version of the same time series x shifted by a phase shift τ that varies. These correlation values are then stored in acorr, as shown above at line 5. The maximum absolute value of the entries of acorr is the autocorrelation score ("r") and the argument t where such maximum is attained is called the "lag."

As illustrated above, for each delay T, the correlation between the time series itself a(t) and a delayed version of itself a(t+τ) can be computed. In other words, a value is generated for each phase shift τ>0. This represents the autocorrelation function A(τ), which is a function of the phase delay τ. In some embodiments, an "autocorrelation score" is the maximum correlation between a time series and a delayed version of itself by a phase, where the corresponding phase is called the lag. For example, the sine function is periodic of phase 2π because the sine curve is identical to itself shifted by a phase of 2π and hence the correlation is the strongest there.

The values generated by an autocorrelation algorithm as described above can be plotted as an autocorrelation graph having values ranging between negative one (−1.0) and positive one (1.0). It may be determined, for example, that good candidate time series for use as training data have periodic autocorrelation graphs with peaks that stay well above 0.5 (or any other defined threshold autocorrelation score based on the particular data involved). In one embodiment, the autocorrelation scores generated for each time series are thus analyzed to determine whether the autocorrelation value reaches 0.5 to determine whether to use a time series as part of a training data set.

Although the use of autocorrelation as described above can be used to filter time series, in practice there may exist a significant number of irregular time series have high autocorrelation scores at small lag values because the data includes extended stretches of somewhat flat regions but generally lack any other type of observable periodicity. In an embodiment, to help additionally filter such time series from a training data set, a "delayed" autocorrelation analysis can be used, where an autocorrelation score generated by a delayed autocorrelation analysis corresponds to a maximum correlation between the time series and a delayed version of itself such that the delay or lag is at least 8 (for example, a default autocorrelation delay of 24 hours may be used or set to any other value depending on the context). In this manner, it can be determined if particular time series exhibit significant autocorrelation past an initial threshold time window to filter out time series showing only very localized and non-cyclical instances of autocorrelation, as described above.

In some embodiments, given a time series x, a delayed autocorrelation and delayed lag can be defined as follows:

```
1     def delayed autocorr (x):
2         n = len (x)
3         x = (x-np .mean(x))
4         result = np.correlate(norm, norm, mode="same")
5
6         acorr = result [ n//2 + 1:] / (x.var ( ) * np.arange (n-1, n//2 , -1))
7         delayed acorr = acorr [delta: ]
8
9         delayed_lag = np.abs(delayed acorr).argmax ( ) + 1
10        delay edr = delay edacorr [delay edlag -1]
11
12        return delayed r, delayed lag
```

As illustrated by the algorithm above, a difference between standard autocorrelation and delayed autocorrelation is that for delayed autocorrelation the calculated set of correlation values between the time series and versions of itself is delayed by at least X hours, where X is the autocorrelation delay (for example, by 24 hours in some examples), and then a maximum value is identified out of only those values that occur at a point after the autocorrelation delay.

Figure 3A:
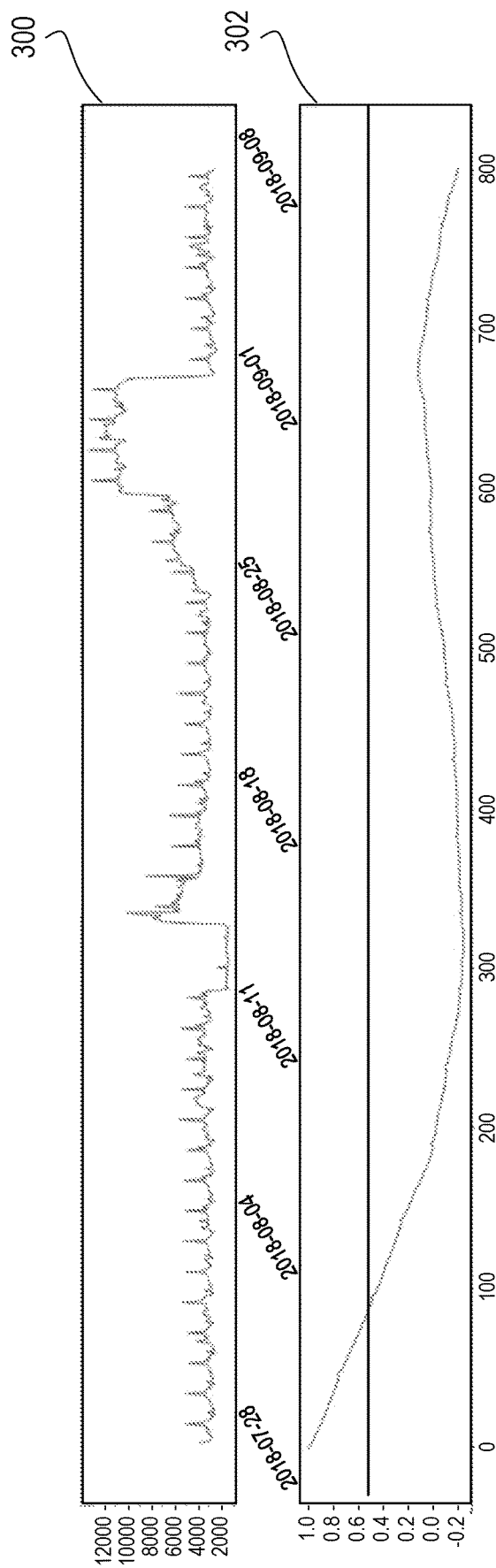
FIG. 3A is a diagram illustrating a time series corresponding to usage of a collection of computing resources and a corresponding autocorrelation graph indicating that the data exhibits relatively low autocorrelation according to some embodiments.
Figure 3B:
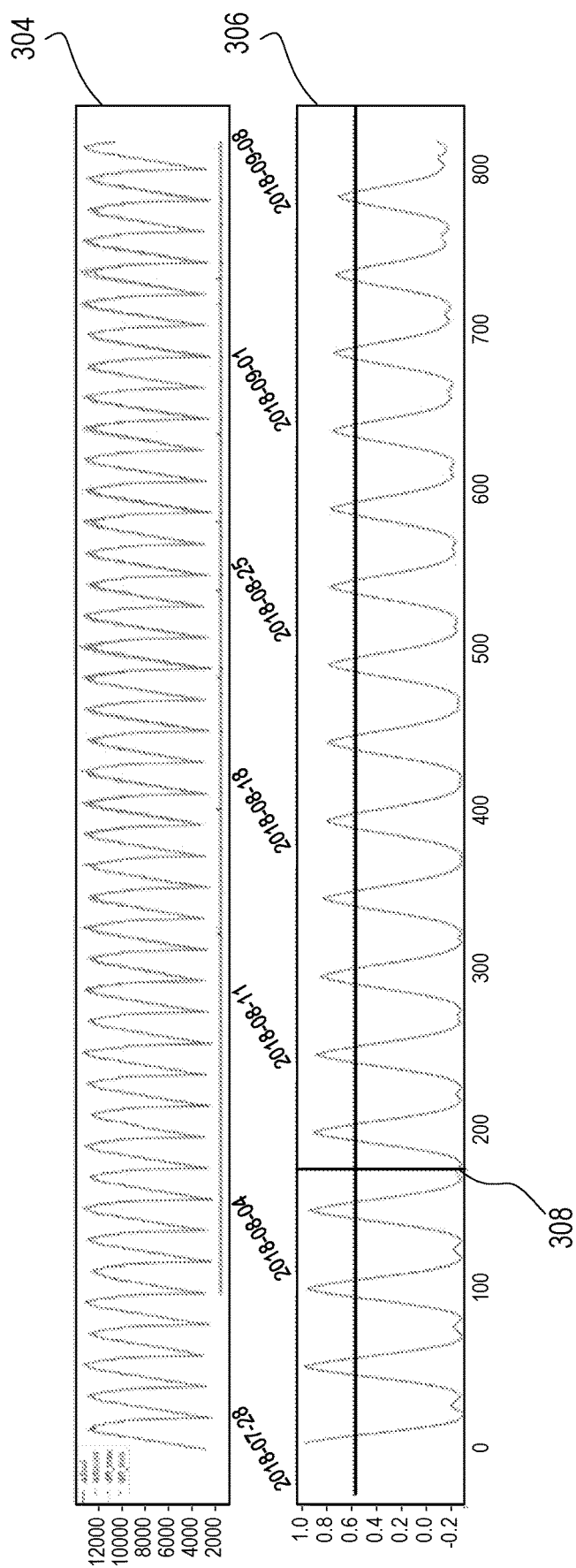
FIG. 3B is a diagram illustrating another time series corresponding to usage of a collection of computing resources and a corresponding autocorrelation graph indicating that the data exhibits relatively high autocorrelation according to some embodiments.
Figure 3C:
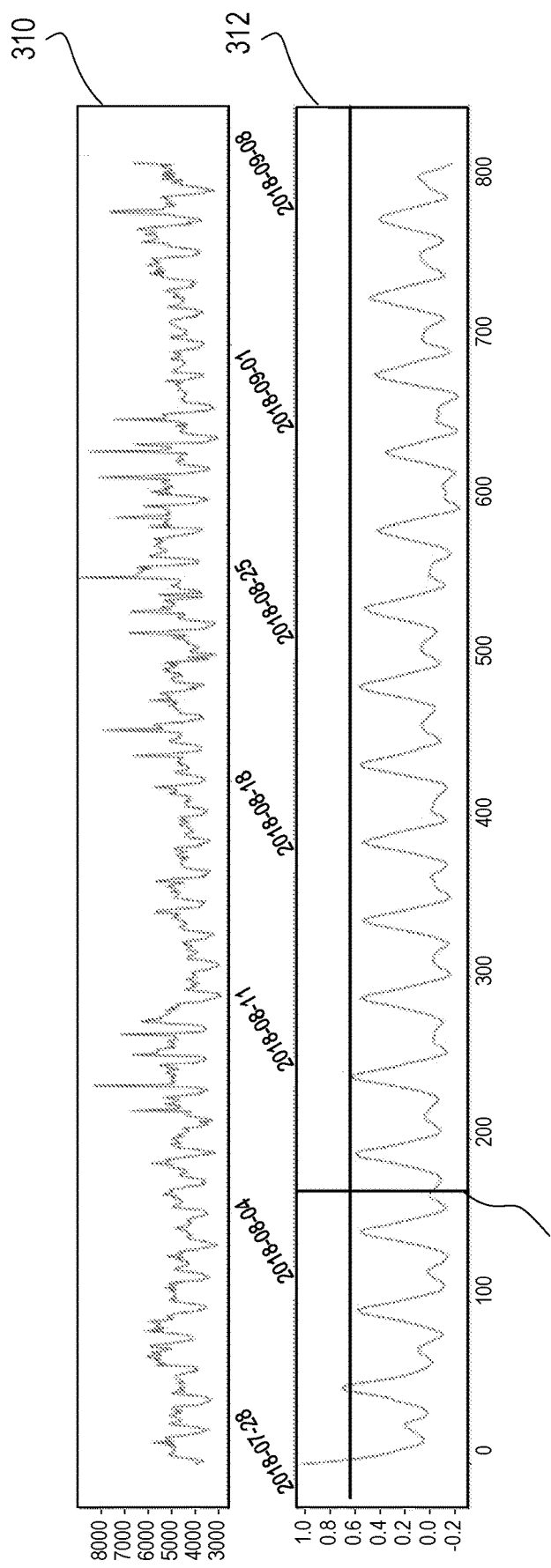
FIG. 3C is a diagram illustrating yet another time series corresponding to usage of a collection of computing resources and a corresponding autocorrelation graph indicating that the data exhibits moderate autocorrelation according to some embodiments.

FIGS. 3A-3C are diagrams illustrating time series corresponding to usage of respective collections of virtual computing resources over a period of time and a corresponding autocorrelation graph according to some embodiments. FIG. 3A, for example, includes a time series graph 300 and a corresponding autocorrelation graph 302 showing a plot of the autocorrelation function for the data shown in graph 300. As illustrated by the graphs in FIG. 3A, for irregular series without any obvious patterns, the autocorrelation score r can be high at first (as shown by the values well above 0.5 early in the autocorrelation graph 302) but the autocorrelation function quickly decays to values under 0.5 shortly thereafter. As indicated above, this phenomenon can be explained in part by the fact that some time series have extended plateaus of flat regions such that a time series can be very similar to itself if it is shifted by just a few hours but that becomes quite irregular after a sufficient period of time. The graphs shown in FIG. 3A illustrate that using a calculated autocorrelation score alone to determine whether a time series exhibits sufficient periodicity may be insufficient to determine if a time series is amenable for use as training data in some contexts.

FIG. 3B illustrates another time series corresponding to usage of a collection of virtual computing resources and a corresponding autocorrelation graph. A visual inspection of the depicted time series graph 304 indicates that the resource's usage pattern exhibits relatively high periodicity. This periodicity is further exemplified by the corresponding autocorrelation graph 306, which itself exhibits a highly periodic pattern with peaks that stay well above 0.5. The autocorrelation graph 306 further illustrates the concept of delayed autocorrelation with the vertical line 308, denoting a time after which a maximum autocorrelation is obtained. Referring again to FIG. 3A, the presence of such an autocorrelation delay limit would show that the autocorrelation function in graph 304 fails to exceed 0.5 at any point following such a delay whereas the function does exceed 0.5 after the delay in the autocorrelation graph 306.

FIG. 3C illustrates yet another diagram illustrating a time series and a corresponding autocorrelation graph showing moderate periodicity according to some embodiments. As shown, the autocorrelation graph 312 associated with the time series graph 310 exhibits some periodicity that slightly decays over time but that does narrowly reach or exceed a defined 0.5 threshold at a point in time subsequent to the delay 314. It is noted that time series with clear periodicity but fluctuating amplitudes still result in periodic autocorrelation graphs but with peaks of varying heights. If the amplitude of the time series changes dramatically, the amplitudes of the autocorrelation functions may decrease to values less than 0.5. In these examples, assuming each of the time series shown in FIGS. 3A-3C were provided as potential training data and a threshold autocorrelation score and delay was used, the time series shown in FIG. 3B and FIG. 3C may be included in the training data while the time series illustrated in FIG. 3A is filtered out and not used in training.

The autocorrelation threshold of 0.5 is used in the examples above for illustrative purposes only; in other examples, the threshold can be set to other values depending on the specifics of the data being analyzed. In some embodiments, an auto scaling service enables users to configure an autocorrelation threshold used to filter time series data used to generate a predictive auto scaling model, an autocorrelation threshold used to determine whether particular collections of computing resources are good candidates for auto scaling services, or both. Furthermore, in some embodiments, users can also configure a delay used as part of a delayed autocorrelation analysis, as described above. For example, if a user desires to select time series with a daily pattern, the user can set the delay=24 hours with an autocorrelation threshold of 0.5. In another example where a user desires to select time series with some pattern but necessarily a daily pattern, the user can specify selection of time series with a lag greater than 2 and an autocorrelation threshold of 0.5 (and without specifying any specific delay). In general, a user can specify any combination of an autocorrelation threshold, delay, and/or lag depending on a particular use case.

In some embodiments, the training data used to build a predictive auto scaling model is further normalized. Given that the raw metrics 126 obtained from a data collection service 104 may span a vast range of magnitudes, for example, normalization can provide several benefits in some cases. One benefit is that normalization can bring the time series to scale so that optimization of the predictive models can happen properly. Furthermore, the normalization of the data allows the predictive model to be exposed to more patterns so that the predictions do not lend undue weight to time series of higher magnitudes. Finally, normalization ensures that time series are brought to scale that is consistent with the domain of the trained model so that meaningful mathematical inferences can be made.

In some embodiments, given a time series x in the raw data, the last 48 hours are removed from the data (for example, x.iloc[:−48]) and the time series is scaled as follows:

$$\bar{x} = \frac{x - \text{mean}(x.iloc[:-48])}{\sqrt{x.iloc[:-48] \cdot \text{var}()}},$$

where ".var( )" denotes the variance of the time series. In other examples, a different range of time is removed from the data, or no data is removed, before scaling.

In some embodiments, at circle "4," a predictive auto scaling model 128 is generated using the filtered and normalized time series data. In some embodiments, the model is a long short-term memory (LSTM)-based recurrent neural network generated assuming Gaussian Distribution in the computation of likelihood. In other embodiments, other models can be used such as other types of ML-based models, autoregressive models, or other forms of predictive modeling known to those of skill in the art.

Figure 2:
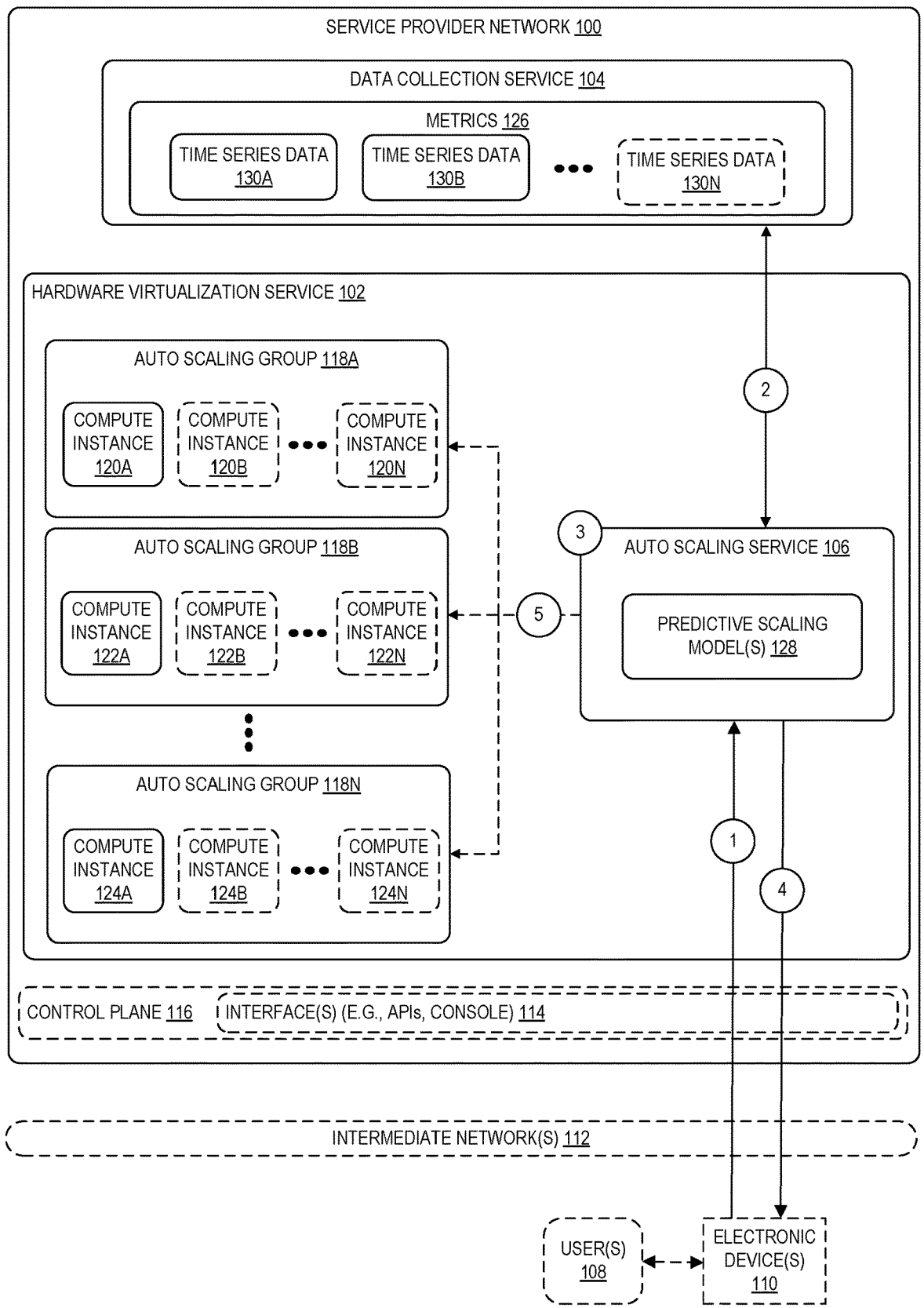
FIG. 2 is a diagram illustrating an environment for identifying collections of computing resources that exhibit usage patterns suitable for predictive auto scaling services, and for using a predictive auto scaling model to proactively scale users' computing resources according to some embodiments.

FIG. 2 is a diagram illustrating an environment for identifying collections of computing resources that exhibit usage patterns suitable for predictive auto scaling services and for using a predictive auto scaling model to scale users' computing resources according to some embodiments. As indicated above, predictive auto scaling generally enables users to have their computing resources scaled in advance of forecasted load changes. To do so, in some embodiments, an auto scaling service 106 applies a predictive model to historical data reflecting load coming into a user's applications (for example, running on compute instances associated with an auto scaling group) to generate a forecast and, based on a generated forecast, the service determines an amount of capacity expected to be needed at future times for the resource. The resource can then be scaled based on the forecast in advance so that when the expected load does arrive, the capacity is already available to handle the load.

However, not all computing resources are amenable to generating such forecasts using a predictive auto scaling model. In some embodiments, an auto scaling service helps users to identify auto scaling groups or other defined collections of computing resources for which predictive auto scaling features are likely to produce accurate and useful results. In an embodiment, an auto scaling service 106 identifies such collections of computing resources by analyzing time series associated with potential computing resources using a delayed autocorrelation analysis, similar that described above, to determine whether a predictive model can be used to proactively scale the resources.

In some embodiments, at circle "1" in FIG. 2, a user uses one or more electronic device(s) 110 to generate and send a request indicating a desire to enable predictive auto scaling of one or more of the user's auto scaling groups. For example, a user 108 may interact with an auto scaling service 106 of a hardware virtualization service 102 via a web-based console, command-line interface, or any other available interface. In other examples, a user 108 can enable predictive auto scaling via a separate service of the service provider network 100 and that may be integrated with the auto scaling service 106. In some embodiments, an auto scaling service 106 is a separate service of a service provider network 100, while in other embodiments the auto scaling service 106 is a component of a hardware virtualization service 102 or any other service of the service provider network 100.

As indicated above, users can create an auto scaling group with various settings including a desired number of compute instances, a maximum number of compute instances, and so forth. In some embodiments, to use predictive auto scaling for an auto scaling group or other defined collection of computing resources, users can choose what is to be done if the capacity forecasted by a predictive scaling model is near to or will exceed the currently specified maximum capacity of the auto scaling group. For example, the options can include capping the forecasted capacity at the maximum capacity, increasing the maximum capacity of the auto scaling group to the forecasted capacity, or increasing the maximum capacity of the auto scaling group to maintain a percentage buffer above the forecasted capacity. If a user selects one of the last two options, the user can further specify an upper bound for the maximum capacity.

In some embodiments, at circle "2" in FIG. 2, historical time series data is obtained for one or more collections of computing resources associated with the user. For example, the auto scaling service 106 may obtain historical time series data associated with all of a users' defined auto scaling groups, with selected auto scaling groups, or in response to a request to analyze a particular auto scaling group or other defined collection of computing resources. In some embodiments, the time series data may be obtained automatically and without input from the user requesting the analysis, or in response to a user request to analyze one or more selected auto scaling groups. In an embodiment, a user may generate such a request using a web-based console or other interface associated with the auto scaling service 106.

As described in relation to FIG. 1, some of all the compute instances of the auto scaling groups 118A-118N are configured to periodically emit or otherwise send various performance metrics 126 to a data collection service 104 of the service provider network 100. The auto scaling service 106 can obtain the metrics 126 from the data collection service 104 via an API or other interface between the services. As described above, metrics 126 can include historical time series data representing the load on various collections of computing resources over time (for example, time series data indicating a quantity of compute instances used at successive past times in an auto scaling group as load changes over time, time series data indicating a request count for an application over time, time series data indicating average CPU load for a collection of compute instances, and so forth).

Similar to the process described in relation to FIG. 1, in some embodiments, the obtained metrics 126 are segmented into separate time series where, for example, each time series may span a time period of two weeks, a month, or any other period of time. As indicated above, the metrics 126 generally indicates a load on one or more defined collections of computing resources at successive points in time in the past and thus each separate time series represents a particular subset of the overall load information.

In some embodiments, at circle "3" in FIG. 2, it is determined whether each of the one or more collections of computing resources being analyzed represents a good candidate for predictive auto scaling based on the obtained historical time series data. In one embodiment, the determination includes performing a delayed autocorrelation analysis on the historical time series data, similar to that performed above in relation to FIG. 1. For example, an autocorrelation score can be generated for one or more of the time series associated with each auto scaling group being analyzed based on a defined delay. In other embodiments, a user's auto scaling groups can be analyzed for potential predictive auto scaling by running forecasts on the obtained historical time series data using the trained scaling prediction model and comparing the generated forecasts to actual data.

In some embodiments, at circle "4" in FIG. 2, users can be shown which of their existing auto scaling groups are good candidates for predictive scaling, for example, based on an autocorrelation score generated for each of the auto scaling groups as described above. For example, a user can access a web-based console or other interface displaying a list or other representation of the user's auto scaling groups and an associated autocorrelation score and possibly one or more autocorrelation graphs from which the autocorrelation score is derived.

Figure 4:
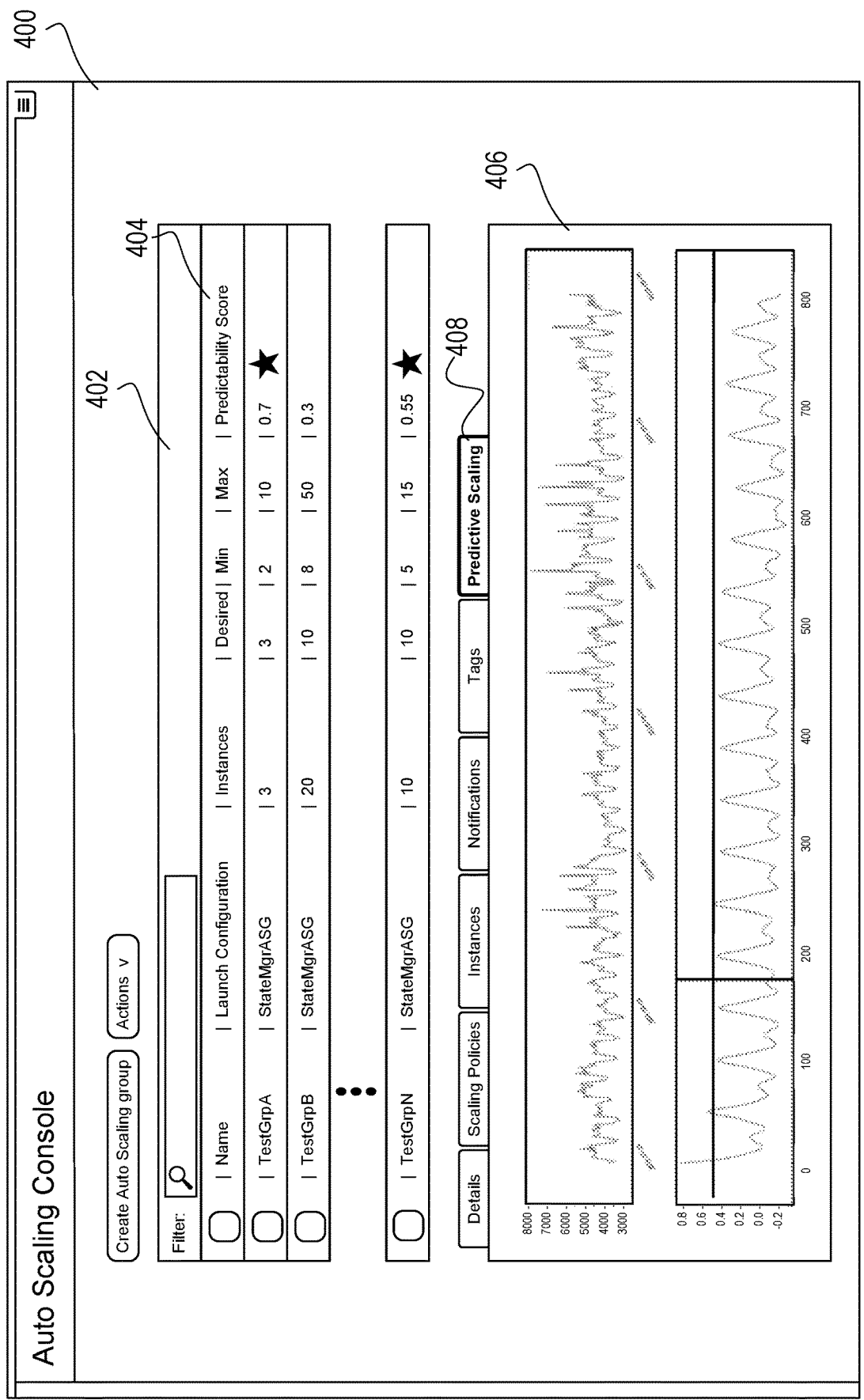
FIG. 4 is an example graphical user interface (GUI) showing a list of auto scaling groups and autocorrelation scores associated with each of the auto scaling groups according to some embodiments.

FIG. 4 is an example graphical user interface (GUI) showing a user's auto scaling groups and autocorrelation scores associated with each of the auto scaling groups according to some embodiments. The interface 400 in FIG. 4, for example, includes an auto scaling group list 402 including columns of information about each auto scaling group associated with a user account such as, for example, a name of the auto scaling group, launch configurations, a number of instances currently in the auto scaling group, a desired number of instances, a minimum and maximum number of instances, among other possible information. As shown, the auto scaling group list 402 further includes a column 404 indicating an autocorrelation or predictability score for each of the auto scaling groups, providing information to a user about how amenable each auto scaling group might be to using predictive auto scaling features. Although an autocorrelation score value is shown in FIG. 4, in other embodiments, other representations can be that are derived from an autocorrelation score for example, different icons or colors for auto scaling groups that are more or less predictable).

The interface 400 of FIG. 4 further includes a panel 406 displaying additional details about a selected auto scaling group. In this example, the panel 406 includes a predictive scaling tab 408 that displays an auto correlation graph associated with the selected auto scaling group. In this manner, users can be provided information about why a selected auto scaling group is associated with a particular predictability score.

In some embodiments, at circle "5" in FIG. 2, the user's virtual computing resources determined to be suitable for predictive auto scaling are scaled by the auto scaling service 106 using the predictive auto scaling model 128. For example, the auto scaling service 106 can send scaling instructions to a hardware virtualization service 102 or other system component that manages associated auto scaling groups 118A-118N, and other capacity-related components. In FIG. 1, for example, the auto scaling service 106 can send instructions to the hardware virtualization service 102 instructing the service to either increase or decrease a number of compute instances included in one or more of the auto scaling groups 118A-11N, assuming that the auto scaling service 106 determines that scaling is appropriate.

In an embodiment, an auto scaling service 106 determines whether to proactively scale an auto scaling group by generating a forecast for the auto scaling group using one or more predictive scaling models 128 and based on historical time series data to determine whether the load for the auto scaling group is expected to increase or decrease at one or more points in time in the future. Based on the forecast, the auto scaling service 106 cause an auto scaling group to increase or decrease a number of compute instances in the group in advance of anticipated load changes. In some embodiments, the auto scaling service 106 can cause an auto scaling group to proactively scale at a time ahead of an anticipated load change that provides sufficient time for the instances to launch and warm-up. For example, there can be data indicating for a particular web application that it takes approximately five minutes on average to launch a new compute instance used to execute an instance of the web application, to warm up associated caches, and to perform other application start up processes before the instance is fully operational. The auto scaling service 106 can obtain this data and determine to launch the instance at least five minutes prior to a future time point when the instance is predicted to be needed, such that the instance is fully operational at the time when demand is predicted to increase.

Figure 5:
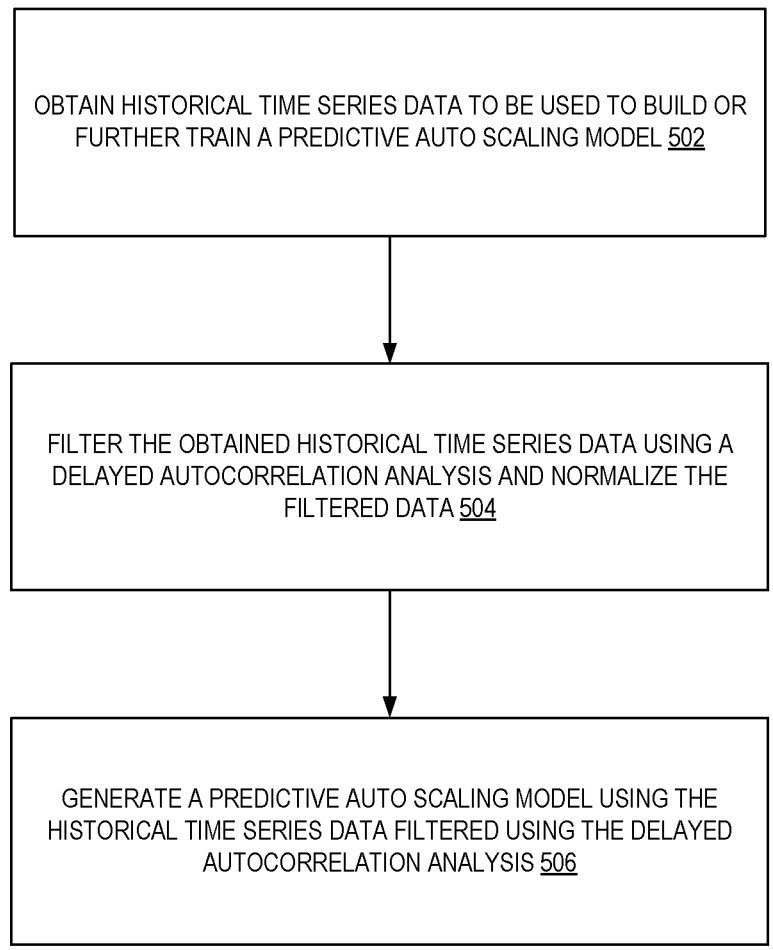
FIG. 5 is a flow diagram illustrating operations of a method for filtering and normalizing training data used to generate a predictive auto scaling model according to some embodiments.

FIG. 5 is a flow diagram illustrating operations 500 of a method for filtering and normalizing training data used to generate a predictive auto scaling model used by an auto scaling service according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by an auto scaling service 106, a hardware virtualization service 102, and a data collection service 104 of the other figures.

The operations 500 include, at block 502, historical time series data is obtained to be used to build or further train a predictive auto scaling model. Referring to FIG. 1, for example, an auto scaling service 106 can obtain metric data collected by a data collection service 104 from any number of auto scaling groups 118A-118N managed by a hardware virtualization service 102. In some embodiments, the obtained metric data can be segmented into a set of separate time series each spanning a defined period of time.

The operations 500 further include, at block 504, the obtained historical time series data is filtered using a delayed autocorrelation analysis and normalized. For example, the auto scaling service 106 can apply a delayed autocorrelation analysis to each time series of a set of time series provided as potential training data. As indicated above, a delayed autocorrelation analysis generally calculates a score value by determining a maximum correlation between the time series and a delayed version of itself, such that the delay or lag is at least a value δ (where the value may be 24 hours or any other length of time depending on the context). In an embodiment, time series that are associated with a delayed autocorrelation score that does not meet or exceed a defined threshold can be excluded from the training data set.

The operations 500 further include, at block 506, a predictive auto scaling model is generated using the historical time series data filtered using the delayed autocorrelation analysis. For example, a predictive scaling model 128 can be a LSTM-based recurrent neural network or any other type of forecasting model generated based on the filtered and normalized training data.

Figure 6:
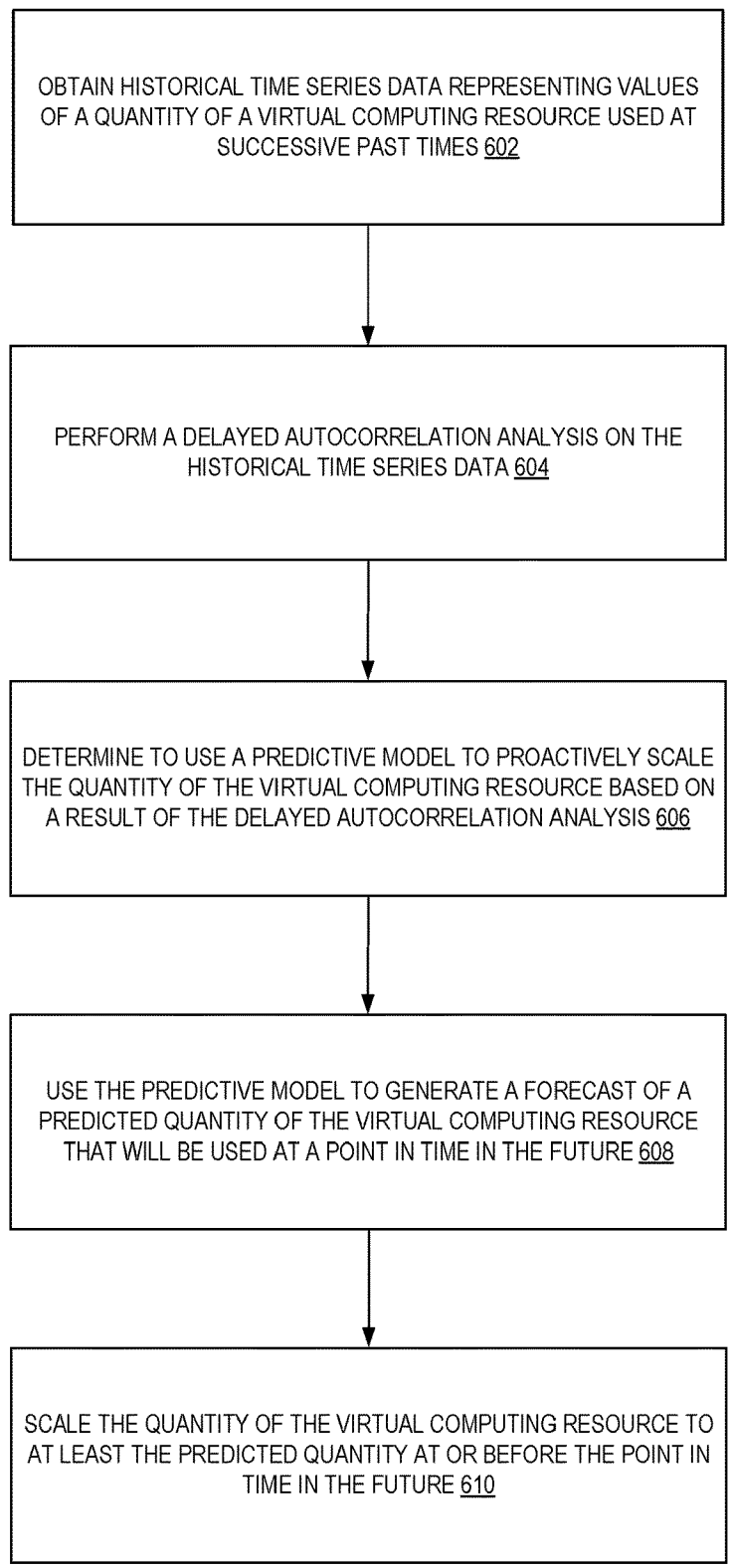
FIG. 6 is a flow diagram illustrating operations of a method for determining whether a computing resource collection exhibits a usage pattern suitable for predictive auto scaling services and, if so, for using a predictive auto scaling model to scale the computing resources based on load forecasts for the computing resource collection according to some embodiments.

FIG. 6 is a flow diagram illustrating operations 600 of a method for filtering and normalizing training data used to generate a predictive auto scaling model used by an auto scaling service according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by an auto scaling service 106, a hardware virtualization service 102, and a data collection service 104 of the other figures.

The operations 600 include, at block 602, obtaining historical time series data representing values of a quantity of a virtual computing resource in a scalable group of virtual computing resources used at successive past time.

The operations 600 further include, at block 604, performing a delayed autocorrelation analysis on the historical time series data. In an embodiment, performing the delayed autocorrelation analysis includes: computing a maximum correlation between at least one time series of the historical time series data and a phase-delayed version of the at least one time series across a plurality of phase delays, wherein the maximum correlation occurs after a defined delay within the time series, and determining whether the maximum correlation exceeds a defined threshold.

The operations 600 further include, at block 606, determining to use a predictive model to proactively scale the quantity of the virtual computing resource in the scalable group of virtual computing resources based on a result of the delayed autocorrelation analysis. In one embodiment, the predictive model is a recurrent neural network (RNN) trained based on training data filtered using a delayed autocorrelation analysis.

The operations 600 further include, at block 608, using the predictive model to generate a forecast of a predicted quantity of the virtual computing resources in the scalable group of virtual computing resources that will be used at a point in time in the future.

The operations 600 further include, at block 610, scaling the quantity of the virtual computing resource in the scalable group of virtual computing resources to at least the predicted quantity at or before the point in time in the future.

Figure 7:
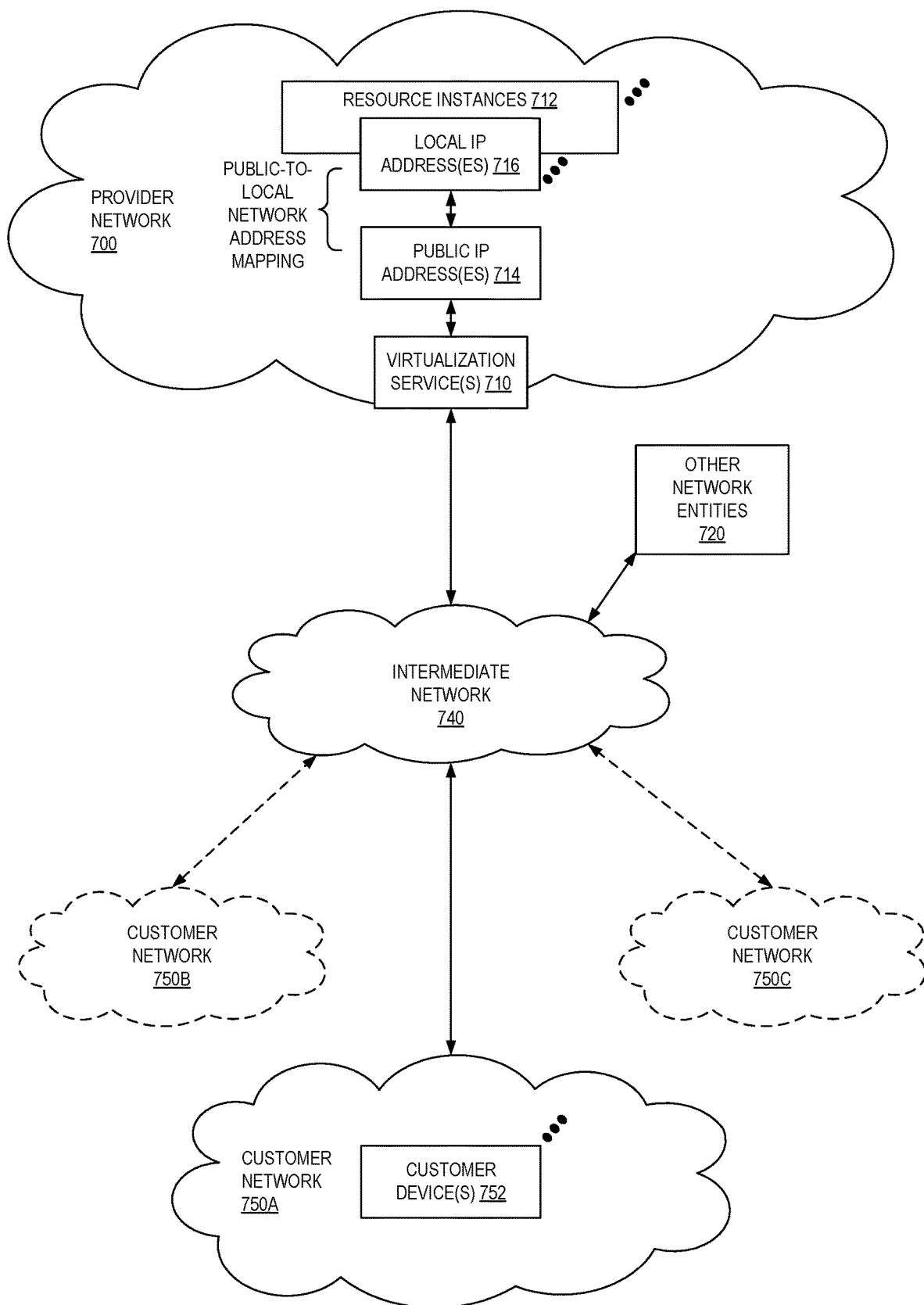
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
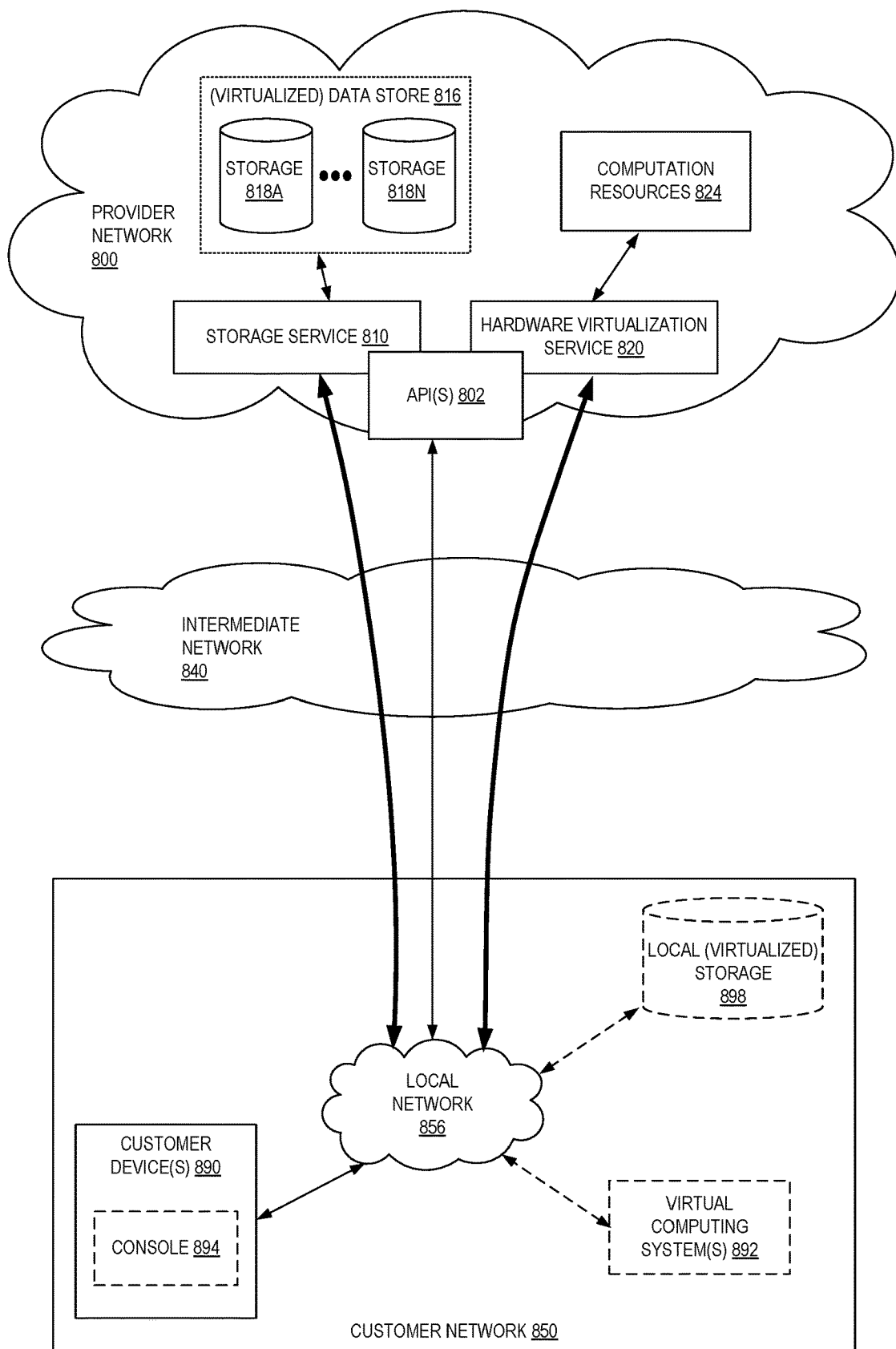
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
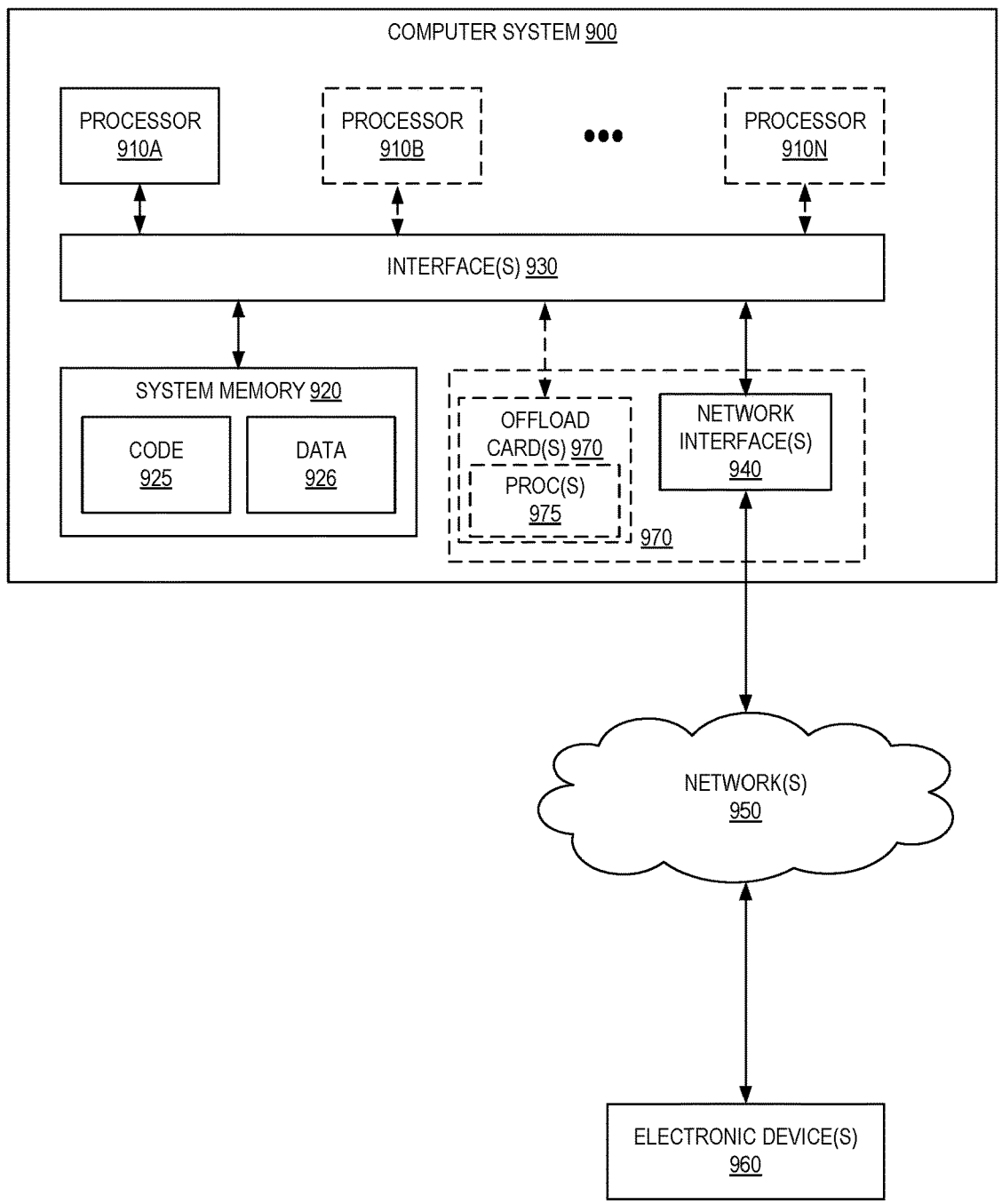
FIG. 9 is a block diagram illustrating an example computer system that may be used in some embodiments.

In some embodiments, a system that implements a portion or all of the techniques for filtering and normalizing training data used to generate a predictive auto scaling model used by an auto scaling service, and for identifying collections of computing resources that exhibit usage patterns suitable for predictive auto scaling services and for using a predictive auto scaling model to scale users' computing resources as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above.

However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining historical time series data representing values of a quantity of a virtual computing resource in a scalable group of virtual computing resources used at successive past times;
    performing a delayed autocorrelation analysis on the historical time series data, wherein performing the delayed autocorrelation analysis includes:
        computing a maximum correlation between at least a portion of the historical time series data and a phase-delayed version of the at least a portion of the historical time series data across a plurality of phase delays, wherein the maximum correlation occurs at one of the plurality of phase delays; and
        determining whether the maximum correlation exceeds a defined threshold;
    determining to use a predictive model to proactively scale the quantity of the virtual computing resource in the scalable group of virtual computing resources based on a result of the delayed autocorrelation analysis;
    using the predictive model to generate a forecast of a predicted quantity of the virtual computing resource in the scalable group of virtual computing resources that will be used at a point in time in the future; and
    scaling the quantity of virtual computing resources in the scalable group of virtual computing resources to at least the predicted quantity at or before the point in time in the future.

2. The computer-implemented method of claim 1, wherein the predictive model is a recurrent neural network (RNN) trained based on training data filtered using the delayed autocorrelation analysis.

3. A computer-implemented method comprising:
    obtaining historical time series data representing values of a quantity of a virtual computing resource used at successive past times;
    performing a delayed autocorrelation analysis on the historical time series data, wherein performing the delayed autocorrelation analysis includes:
        computing a maximum correlation between at least a portion of the historical time series data and a phase-delayed version of the at least a portion of the historical time series data across a plurality of phase delays, wherein the maximum correlation occurs at one of the plurality of phase delays; and
        determining whether the maximum correlation exceeds a defined threshold;
    based on a result of the delayed autocorrelation analysis, determining to use a predictive model to proactively scale the quantity of the virtual computing resource; and
    using an output of the predictive model to proactively scale the quantity of the virtual computing resource.

4. The computer-implemented method of claim 3, wherein proactively scaling the quantity of the virtual computing resource comprises provisioning additional instances of the virtual computing resource in advance of a predicted increase in demand for the virtual computing resource.

5. The computer-implemented method of claim 3, further comprising:
    using the predictive model to generate a forecast of a predicted quantity of the virtual computing resource that will be used at a point in time in the future; and scaling the quantity of the virtual computing resource to at least the predicted quantity at or before the point in time in the future.

6. The computer-implemented method of claim 3, wherein performing the delayed autocorrelation analysis includes:
   receiving input specifying one or more of: an autocorrelation value threshold, and an autocorrelation delay value;
   computing an autocorrelation score corresponding to a maximum correlation between at least a portion of the historical time series data and a phase-delayed version of the at least a portion of the historical time series data across a plurality of phase delays; and
   determining whether the autocorrelation score exceeds the autocorrelation value threshold.

7. The computer-implemented method of claim 3, wherein the virtual computing resource includes a defined collection of compute instances managed by a hardware virtualization service of a service provider network, the computer-implemented method further comprising using the hardware virtualization service to proactively scale the quantity of the virtual computing resource based on the output of the predictive model.

8. The computer-implemented method of claim 3, further comprising obtaining the historical time series data from a data collection service of a service provider network.

9. The computer-implemented method of claim 3, wherein proactively scaling the quantity of the virtual computing resource comprises provisioning or de-provisioning at least one of: a virtual machine (VM) instance, a container, a database table, or a database index.

10. The computer-implemented method of claim 3, wherein the virtual computing resource comprises a virtual machine, the computer-implemented method further comprising:
    determining, based on the output of the predictive model, that there will be demand for at least one additional instance of the virtual machine at a future time point;
    determining an amount of time needed to warm-up the instance of the virtual machine; and
    launching the at least one additional instance at least the determined amount of time prior to the future time point.

11. The computer-implemented method of claim 3, further comprising:
    based on a result of the delayed autocorrelation analysis, determining to output a recommendation to a user associated with the virtual computing resource, the recommendation indicating to use the predictive model for proactive scaling for the virtual computing resource; and
    using the output of the predictive model to proactively scale the quantity of the virtual computing resource in response to the user opting in to the proactive scaling.

12. The computer-implemented method of claim 11, further comprising:
    generating an autocorrelation score based on performing the delayed autocorrelation analysis on the historical time series data; and
    presenting, as part of the recommendation, a representation of the autocorrelation score to the user associated with the virtual computing resource.

13. A system comprising:
    an auto scaling service implemented by a first one or more electronic devices, the auto scaling service including first instructions that upon execution cause the auto scaling service to:
       obtain historical time series data representing values used at successive past times of a quantity of a virtual computing resource in a scalable group;
       perform a delayed autocorrelation analysis on the historical time series data wherein, to perform the delayed autocorrelation analysis, the first instructions, upon execution, further cause the auto scaling service to:
          compute a maximum correlation between at least a portion of the historical time series data and a phase-delayed version of the at least a portion of the historical time series data across a plurality of phase delays, wherein the maximum correlation occurs at one of the plurality of phase delays; and
          determine whether the maximum correlation exceeds a defined threshold;
       determine to use a predictive model to proactively scale the quantity of the virtual computing resource in the scalable group based on a result of the delayed autocorrelation analysis;
       use the predictive model to generate a forecast of a predicted quantity of the virtual computing resource in the scalable group that will be used at a point in time in the future; and
       send scaling instructions to a hardware virtualization service, the scaling instructions indicating the predicted quantity of the virtual computing resource; and
    a hardware virtualization service implemented by a second one or more electronic devices, the hardware virtualization service including second instructions that upon execution cause the hardware virtualization service to:
       receive the scaling instructions from the auto scaling service; and
    scale the quantity of the virtual computing resource in the scalable group to at least the predicted quantity at or before the point in time in the future.

14. The system of claim 13, wherein the predictive model is a recurrent neural network (RNN) trained based on training data filtered using a delayed autocorrelation analysis.

15. The system of claim 13, wherein the virtual computing resource includes a defined collection of compute instances managed by the hardware virtualization service.

16. The system of claim 13, wherein the scalable group is associated with a cyclically varying load over time.

17. The system of claim 13, wherein the first instructions, upon execution, further cause the auto scaling service to:
    generate an autocorrelation score based on performing the delayed autocorrelation analysis on the historical time series data; and
    present a representation of the autocorrelation score to a user associated with the virtual computing resource.

* * * * *